United States Patent Office

3,659,018
Patented Apr. 25, 1972

3,659,018
COMPOSITIONS AND METHODS OF USING N - PENTAHALOPHENLI-AMINO-AMMONIUM SALTS
Werner Daum, Krefeld-Bockum, and Hans Scheinpflug, Leverkusen, Germany, assignors to Farbenfabriken Bayer Aktiengesellschaft, Leverkusen, Germany
No Drawing. Original application Sept. 23, 1966, Ser. No. 581,442, now Patent No. 3,518,308, dated June 30, 1970. Divided and this application Jan. 8, 1970, Ser. No. 7,311
Claims priority, application Germany, Sept. 27, 1965, F 47,281
Int. Cl. A01n 9/20, 9/28
U.S. Cl. 424—329
13 Claims

---

ABSTRACT OF THE DISCLOSURE

Bactericidal compositions and methods of using N-pentahalophenyl-amino ammonium salts having the formula

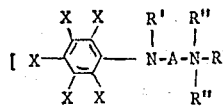

in which A is lower alkylene, R' is hydrogen or alkyl, at most one R" group is arylmethyl, optionally substituted with halo, nitro, alkoxy, alkyl and/or methylene dioxy, at least two R" groups are aliphatic, optionally halo-substituted, X is chloro and/or bromo, and Z is a salt-forming anion, e.g. halo-anion, which possess bactericidal activity and which may be produced by conventional methods.

---

This is a divisional application of copending U.S. parent application Ser. No. 581,442, filed Sept. 23, 1966, now U.S. Pat. No. 3,518,308.

The present invention relates to particular new N-pentahalo-phenyl-amino ammonium salts which may be used as active compounds for combating phytopathogenic bacteria, to their bactericidal compositions with dispersible carrier vehicles, and to methods for the production and use thereof.

Organic synthetic compounds for combating phytopathogenic bacteria have not yet been used.

It is known, however, that cupric oxychloride can be used in plant protection for combating phytopathogenic bacteria. In spite of its high fungicidal activity, nevertheless, this active compound has only a slight bactericidal effect. As no other bactericides are available for combating phytopathogenic bacteria, cupric oxychloride has a certain importance in practice, in spite of its relatively poor effect.

It is an object of the present invention to provide particular new N-pentahalophenyl-amino ammonium salts which possess valuable phytopathogenic bactericidal properties; to provide active compositions in the form of mixtures of such compounds with liquid and solid dispersible carrier vehicles; to provide processes for producing such compounds; and to provide methods of using such compounds in a new way, especially for combating phytopathogenic bacteria.

Other and further objects of the present invention will become apparent from a study of the within specification and accompanying examples.

It has now been found in accordance with the present invention that the particular new N-pentahalophenyl-amino ammonium salts having the formula

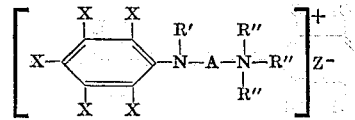

in which A is lower alkylene having at least 2 carbon atoms, R' is selected from the group consisting of hydrogen and alkyl having 1–4 carbon atoms, each R" respectively is selected from the group consisting of arylmethyl having 6–10 carbon atoms in the aryl moiety; such arylmethyl which is substituted with at least one member selected from the group consisting of halo, nitro, lower alkoxy, alkyl having 1–12 carbon atoms, methylene dioxy, and mixtures thereof; lower aliphatic; and halo lower aliphatic; with the proviso that at most one R" is such an aryl methyl, each X respectively is selected from the group consisting of chloro and bromo, and Z is a corresponding salt forming anion, have strong bactericidal properties against phytopathogenic bacteria.

More particularly, the compounds of the present invention surprisingly have a higher bactericidal activity against phytopathogenic bacteria than the cupric oxychloride known in the art.

The particular new pentahalo-phenyl-amino ammonium salts of the present invention may be obtained by the process which comprises reacting N-pentahalo-phenyl-amines of the formula

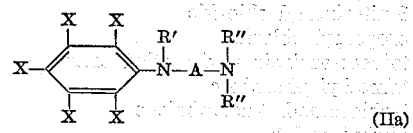

in which A, R', and R" and X have the same meaning as defined above, with alkylating agents containing a radical R" as the alkylating radical, optionally in the pressure of diluents.

When N' - pentachlorophenyl-N¹,N²,N²-trimethyl-hexamethylene-diamine and 2,4-diisopropyl-benzyl chloride are used as starting materials, the course of the reaction can be illustrated by the following equation:

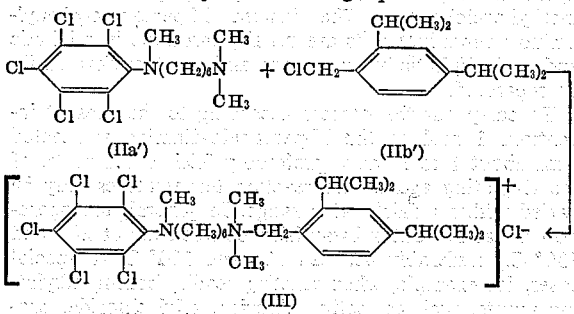

Individual examples of N-pentahalo-phenyl-diamines which can be reacted in acocrdance with the present invention are the following:

N¹-pentachlorophenyl-N²,N²-dimethyl-ethylene-diamine
N¹-pentachlorophenyl-N²-allyl-N²-methyl-ethylene-diamine
N¹-pentachlorophenyl-N¹,N²,N²-trimethyl-trimethylene-diamine
N¹-pentachlorophenyl-N²,N²-diethyl-trimethylene-diamine
N¹-pentachlorophenyl-N¹,N²,N²-trimethyl-tetramethylene-diamine
N¹-pentachlorophenyl-N²,N²-dimethyl-hexamethylene-diamine
N¹-pentachlorophenyl-N¹,N²,N²-trimethyl-hexamethylene-diamine
N¹-pentachlorophenyl-N¹,N²-dimethyl-N²-benzyl-hexamethylene-diamine
N¹-pentachlorophenyl-N²,N²-diallyl-hexamethylene-diamine
N¹-pentabromophenyl-N²,N²-dimethyl-hexamethylene-diamine.

The partially alkylated N¹-pentahalophenyl-diamines used as starting materials have not yet been disclosed but they can be obtained by various methods.

For example, they can be prepared by methylating appropriate N-pentahalo-phenyl-diamines with a mixture of formic acid and formaldehyde.

They can also be obtained by reacting $N^2,N^2$-di-substituted or $N^1,N^2,N^2$-tri-substituted alkylene-diamines with hexachlorobenzene by known methods (cf. U.S. Pat. 2,829,164).

To prepare the instant N-pentahalo-phenylamino ammonium salts from such N¹-pentachlorophenyl-diamines, all conventional alkylating agents which contain an alkylating radical R″ as defined above can be used. The following is a list of typical individual alkylating agents of the type which may be used:

allyl chloride
ethyl bromide
benzyl iodide
butyl iodide
3-chloroallyl chloride
2,5-dimethyl-benzyl chloride
4-isododecyl-benzyl chloride
methane-phosphonic acid dipropyl ester
methyl chloride
3-nitrobenzyl chloride
propargyl chloride
toluene-sulfonic acid methyl ester
trimethyl phosphate
1-chloromethyl-naphthalene
diethyl sulfate
2,5-diisopropyl-benzyl chloride
3,4-dichloro-benzyl chloride
2,4-dimethyl-benzyl chloride Suitable diluents for the instant alkylation are alcohols, such as butanol; nitriles, such as acetonitrile; ethers such as dioxan and dibutyl ether; and aromatic and aliphatic hydrocarbons, such as benzene, xylene, cyclohexane and methyl-cyclohexane. The instant N-pentahalo-phenyl-amino ammonium salts are usually insoluble in aliphatic and cycloaliphatic hydrocarbons and can therefore easily be separated.

To carry out the process according to the present invention, 1 mol of the N-pentahalo-diamine is reacted with about 1 to 3 mols, preferably 0.95 to 1.1 mols, of the alkylating agent. The reaction temperatures may be varied within a fairly wide range. In general, the operation is carried out substantially between about 20° and 130° C., preferably between 70° and 110° C. In special cases, for example, when reacting readily boiling alkylating agents, such as methyl chloride, allyl chloride, propargyl chloride, etc., it may be advantageous to carry out the reaction under pressure. The range of pressure is then determined by the partial pressure of the alkylating agent.

Moisture must be strictly excluded in order to avoid difficulties in working up the reaction products since the majority of the compounds are extremely hygroscopic.

Indeed, the particular active compounds according to the present invention have a strong bactericidal activity against phytopathogenic bacteria, and advantageously because of their low toxicity towards warm-blooded animals and their low phytotoxicity they can be used with extremely good results in plant protection against bacterial diseases.

Bactericidal agents are used in plant protection chiefly against species of Xanthomonas, Pseudomonas and Erwinia.

The active compounds according to the present invention have proved especially satisfactory for combating *Xanthomonas malvacearum* in cotton and *Pseudomonas vesicatoria* in tomatoes.

Among the particular compounds of the present invention, the following are representative:

(III) $N^2$ - [6-(N′-pentachlorophenyl-N′-methyl-amino)hexyl] - $N^2,N^2$-dimethyl-$N^2$-(2′,4′-diisopropylbenzyl) ammonium chloride having the formula

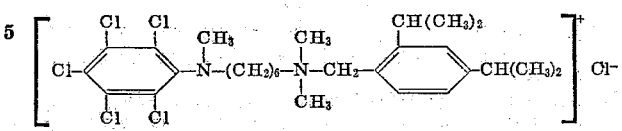

(IV) $N^2$ - [2 - (N′-pentachlorophenyl-amino)ethyl(-$N^2$, $N^2$-dimethyl-$N^2$-benzyl ammonium chloride having the formula

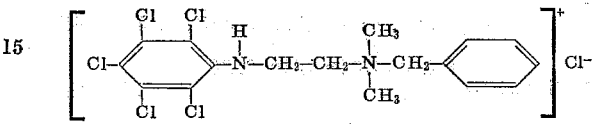

(V) $N^2$ - [6 - (N′-pentachlorophenyl-N′-methyl-amino)hexyl] - $N^2,N^2$-dimethyl-$N^2$-(4′-chlorobenzyl)ammonium chloride having the formula

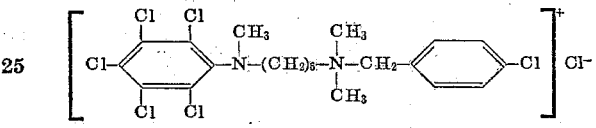

(VI) $N^2$ - [6-(N′-pentachlorophenyl-N′-methyl-amino)hexyl] - $N^2,N^2$ - dimethyl-$N^2$-(4′-nitrobenzyl)ammonium chloride having the formula

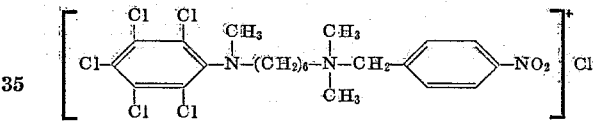

(VII) $N^2$-[6-(N′-pentachlorophenyl-N′-methyl-amino)hexyl]$N^2,N^2$ - dimethyl - $N^2$ - (3′-nitrobenzyl)ammonium chloride having the formula

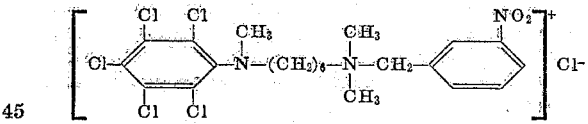

(VIII) $N^2$-[6-(N′-pentachlorophenyl-N′-methyl-amino)hexyl]-$N^2,N^2,N^2$-trimethyl ammonium iodide having the formula

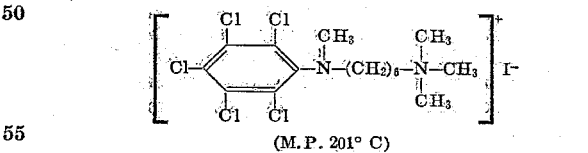

(M.P. 201° C)

(IX) $N^2$ - [2 - (N′ - pentachlorophenyl - amino)ethyl]-$N^2,N^2$-dimethyl-$N^2$-allyl ammonium chloride having the formula

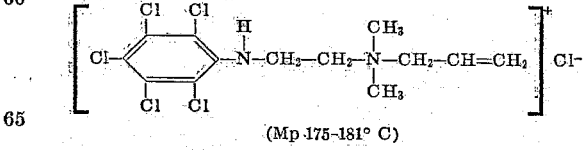

(Mp 175-181° C)

(X) $N^2$-[2-(N′-pentachlorophenyl-amino)ethyl]-$N^2,N^2$, dimethyl-$N^2$-propargyl ammonium chloride having the formula

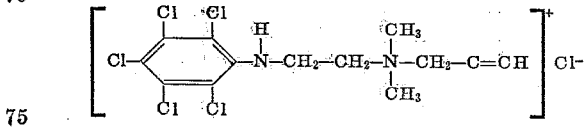

(XI) $N^2$ - [6-($N'$-pentachlorophenyl-$N'$-methyl-amino)hexyl] - $N^2,N^2$ - dimethyl - $N^2$-(3',4'-dichlorobenzyl)ammonium chloride having the formula

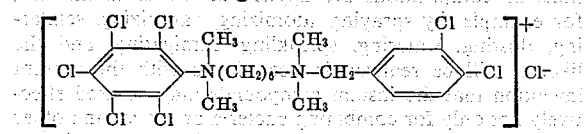

(XII) $N^2$-[6-($N'$-pentachlorophenyl-$N'$-methyl-amino)hexyl] - $N^2,N^2$ - dimethyl-$N^2$-(2',5'-dimethylbenzyl)ammonium chloride having the formula

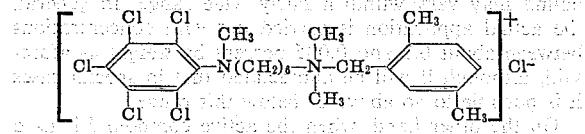

(XIII) $N^2$ - [6 - ($N'$ - pentachlorophenyl - $N'$ - methyl-amino)hexyl] - $N^2,N^2$ - dimethyl - $N^2$-(2',4'-dimethylbenzyl)ammonium chloride having the formula

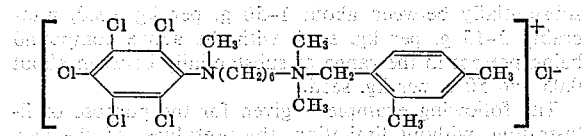

(XIV) An isomer mixture of $N^2$-[6-$N'$-pentachlorophenyl - $N'$ - methylamino) - hexyl]-$N^2,N^2$-dimethyl-$N^2$-(2',3'-dimethylbenzyl)ammonium chloride and $N^2$-[6-($N'$-pentachlorophenyl - $N'$ - methyl-amino)hexyl]-$N^2,N^2$-dimethyl - $N^2$ - (3',4' - dimethylbenzyl)ammonium chloride having the formula

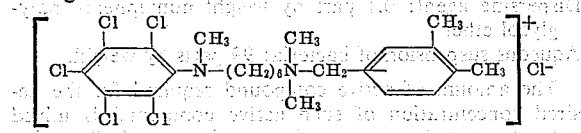

(XV) $N^2$ - [6 - ($N'$ - pentachlorophenyl - $N'$ - methyl-amino)hexyl] - $N^2,N^2$ - dimethyl - $N^2$ - (1' - naphthylmethyl)ammonium chloride having the formula

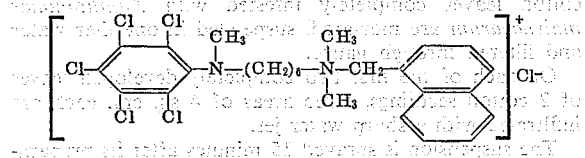

(XVI) $N^2$ - [6 - ($N'$-pentachlorophenyl - $N'$ - methyl-amino)hexyl] - $N^2,N^2$ - dimethyl - $N^2$ - (4' - dodecyl-benzyl)ammonium chloride having the formula

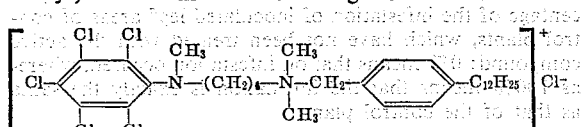

(XVII) $N^2$ - [6 - ($N'$ - pentachlorophenyl - amino)hexyl] - $N^2,N^2$ - diallyl - $N^2$ - methyl - ammonium methyl sulfate having the formula

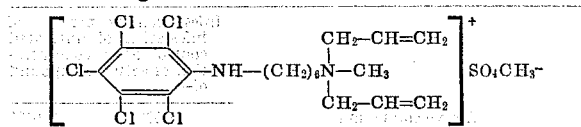

(XVIII) $N^2$ - [2 - ($N'$ - pentachlorophenyl - amino)ethyl] - $N^2,N^2$ - dimethyl - $N^2$ - (2',5' - dimethylbenzyl)ammonium chloride having the formula

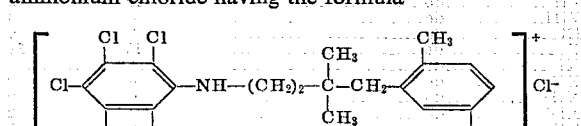

(XIX) $N^2$ - [4 - ($N'$-pentachlorophenyl - $N'$ - methyl-amino)butyl] - $N^2,N^2$ - dimethyl-$N^2$ - (2',5' - dimethylbenzyl)ammonium chloride having the formula

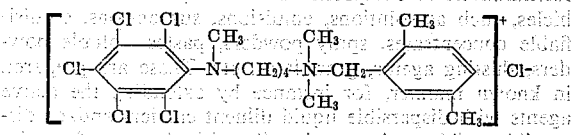

(M.P. 183° C.)

(XX) $N^2$ - [6 - ($N'$ - pentachlorophenyl - $N'$ - methyl-amino)hexyl - $N^2,N^2$ - dimethyl - $N^2$ - (3' - chloroallyl)ammonium chloride having the formula

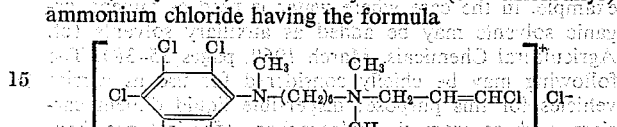

(XXI) $N^2$ - [6 - ($N'$ - pentabromophenyl - amino)hexyl] - $N^2,N^2$ - dimethyl - $N^2$ - (3' - chloroallyl)ammonium chloride having the formula

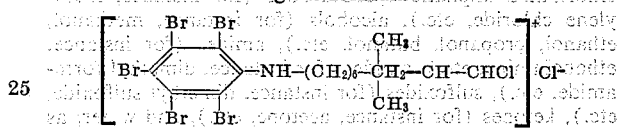

(XXII) $N^2$ - [6 - ($N'$ - pentachlorophenyl-$N'$-methyl-amino)hexyl] - $N^2$ - methyl - $N^2$ - (3' - chloroallyl)-$N^2$ - benzyl ammonium chloride having the formula

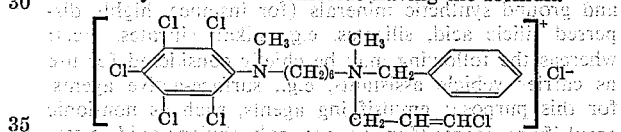

(XXIII) An isomer mixture of $N^2$ - [6 - ($N'$ - pentachlorophenyl - $N'$ - methyl - amino) - hexyl] - $N^2,N^2$-dimethyl - $N^2$ - (3',4' - methylene dioxy - 6' - propyl-benzyl)ammonium chloride and $N^2$ - [6 - ($N'$ - pentachlorophenyl - $N'$ - methyl - amino)hexyl] - $N^2,N^2$-dimethyl - $N^2$ - (2',3' - methylene dioxy-5'-propyl-benzyl) ammonium chloride having the formula

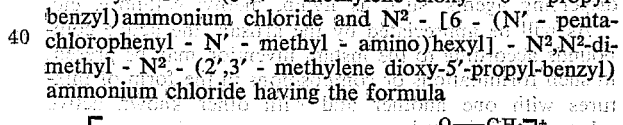

(XXIV) $N^2$ - [6 - ($N'$ - pentachlorophenyl-$N'$-methyl-amino)hexyl]-$N^2,N^2$-dimethyl - $N^2$ - (4' - ethoxybenzyl) ammonium chloride having the formula

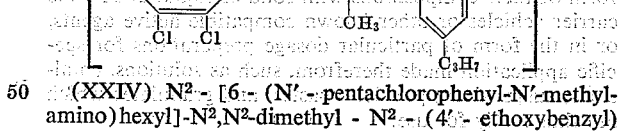

(XXV) $N^2$ - [6 - ($N'$ - pentachlorophenyl-$N'$-methyl-amino)hexyl] - $N^2,N^2$ - dimethyl - $N^2$ - (2',3'-dibromo-allyl)ammonium chloride having the formula

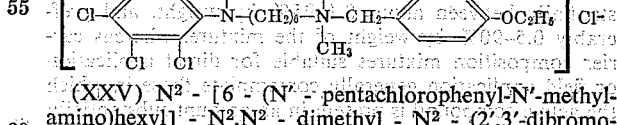

(XXVI) $N^2$-[6-($N'$-pentachlorophenyl-$N'$-ethyl-amino)hexyl]-$N^2,N^2$-diethyl-$N^2$-methyl ammonium iodide having the formula

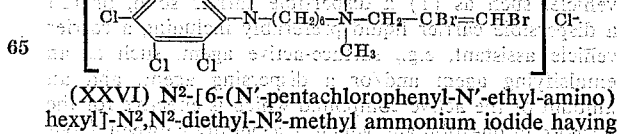

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic emulsifying agents (for instance, polyethylene oxide esters of fatty acids, polyethylene oxide ethers of fatty alcohols, and especially alkyl aryl-polyglycol ethers, etc.); and dispersing agents, such as lignin, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.005 and 0.2% by weight of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.005 and 95% by weight of the mixture.

Furthermore, the present invention contemplates methods of combating phytopathogenic bacteria which comprise applying to at least one of (a) such bacteria and (b) their habitat, a bactericidally, especially phytopathogenically bactericidally, effective amount of the particular active compound of the invention alone or together with a carrier vehicle, as noted above. The instant formulations or compositions are applied in the usual manner, for example, by spraying, atomizing, vaporizing, scattering, dusting, watering, sprinkling, fumigating, and the like. It will be realized in accordance with the present invention that the instant compounds may be used effectively not only for combating bacteria on leaves and other parts of plants above-ground but also for seed dressing.

In this regard, when used for treating parts of the plants above-ground, the concentration of the active compound may vary within a fairly wide range. In general, the actual application is carried out with concentrations between about 0.2 and 0.005 percent by weight as aforesaid, although it will be appreciated that in special cases it is possible to go above or below this range.

On the other hand, when the active compound is used as seed dressing, it can be contained in the dressing in an amount of about 5–100%, preferably 10–80%, of the dressing. The seed dressings may be used in amounts of substantially between about 1–50 g. per kg. seed, preferably 2–15 g. per kg. seed, with the active compound being present in the range of substantially between about 0.05 and 50 g. per kg. seed.

The following example is given for the purpose of illustrating, without limitation, the usefulness of the particular compounds according to the present invention:

EXAMPLE 1

Bacterial test /Xanthomonas malvacearum

Solvent: 0.9 part by weight acetone
Dispersing agent: 0.1 part by weight nonylphenol polyglycol ether
Aqueous suspension of bacteria: 99 parts by weight.

The amount of active compound required for the desired concentration of such active compound is mixed with the stated amounts of the solvent and dispersing agent and the resulting concentrate is diluted with the stated amount of aqueous suspension of the bacteria.

To prepare the suspension of bacteria, 60 sq. cm. of cotton leaves completely infested with Xanthomonas malvacearum are mortared, suspended in one liter water and filtered through gauze.

On each of the first two completely developed leaves of 2 cotton seedlings, three areas of 4 sq. cm. each are infiltrated with a sharp water jet.

The suspension is sprayed 15 minutes after its preparation onto the total of 12 water infiltrated leaf areas.

Seven days after the treatment with the suspension, the infestation of the leaf areas is determined as a percentage of the infestation of inoculated leaf areas of control plants, which have not been treated with the active compound: 0% means that no infestation occured, whereas 100% means that the infestation is exactly the same as that of the control plants.

The active compounds, their concentrations and the results obtained can be seen from the following Table 1:

TABLE 1

Bacteria test/Xanthomonas malvacearum

| Active compound | | Infestation as percent of infestation of untreated control at a concentration of active compound of— | |
|---|---|---|---|
| | | 0.03% | 0.01% |
| A | Cupric oxychloride (known) | 65 | 100 |
| IV | Invention | 22 | |
| V | do | 15 | |
| VI | do | 11 | 37 |
| VII | do | 21 | 30 |
| VIII | do | 0 | 0 |
| IX | do | 0 | 0 |
| X | do | 18 | 31 |
| XI | do | 14 | |
| XII | do | 0 | 0 |
| XIII | do | 0 | 0 |
| XIV | do | 0 | 2 |
| XV | do | 0 | 87 |

TABLE 1—Continued

| Active compound | | Infestation as percent of infestation of untreated control at a concentration of active compound of— | |
|---|---|---|---|
| | | 0.03% | 0.01% |
| III | Invention | 4 | 94 |
| XVI | do | 16 | |
| XVII | do | 0 | 0 |
| XVIII | do | 0 | |
| XIX | do | 13 | |
| XX | do | 2 | |
| XXI | do | 2 | |
| XXII | do | 8 | |
| XXIII | do | 0 | |
| XXIV | do | 0 | |
| XXV | do | 0 | 0 |
| XXVI | do | 0 | 0 |

The preparation of some of the particular active compounds according to the invention is described in greater detail by way of illustration and not limitation, in the following examples:

EXAMPLE 2

Preparation of compound XXII 121 g. $N^1$ - pentachlorophenyl - $N^1,N^2$-dimethyl-$N^2$-benzylhexamethylene-diamine (0.251 mol) and 56 g. cis, trans-1,3-dichloropropane (0.505 mol) are mixed and kept at 80° for 18 hours. The viscous mass crystallizes after the addition of 200 ml. light petrol. After 2 hours, the crystals are separated and washed with 300 ml. light petrol. After drying at 70° C., the yield of $N^2$-[6-($N^1$-pentachlorophenyl - $N^1$-methyl-amino)hexyl]-$N^2$-methyl-$N^2$ - benzyl - $N^2$ - (3′ - chloroallyl)ammonium chloride amounts to 144.2 g. (97% of theory, referred to the diamine used). The ammonium salt can be recrystallized from a little toluene. Nitrogen: found 4.91%, calculated 4.72%; chlorine: found 42.0%, calculated 41.9%.

The required starting material is prepared as follows: 165.5 g. $N^2$ - benzyl - $N^1$ - pentachlorophenyl-hexamethylenediamine (0.364 mol) are added dropwise in the course of 9 minutes to a mixture, heated to 80° C., of 85.5 g. 98% formic acid (1.82 mol) and 69 g. of a 35% formaldehyde solution (0.8 mol). The reaction mixture is then kept at 88° C. for 4 hours. After working up, 165.5 g. crude $N^2$-benzyl-$N^2,N^1$-dimethyl-$N^1$-pentachlorophenyl-hexamethylene-diamine are obtained.

EXAMPLE 3

Preparation of active compound VIII 34.1 g. methyl iodide (0.24 mol) are added dropwise in the course of 10 minutes to a solution of 98 g. $N^1$-pentachlorophenyl - $N^1,N^2,N^2$ - trimethyl-hexamethylenediamine (0.242 mol) in 500 ml. cyclohexane, which is kept at 50° C. The reaction mixture is kept 50° C. for a further 8 hours, the crystals formed are separated, washed with cyclohexane and recrystallized from water or chlorobenzene. The yield of $N^2$ - [6 - ($N^1$-pentachlorophenyl-$N^1$ - methyl-amino)hexyl] - $N^2,N^2,N^2$-trimethyl ammonium iodide of M.P. 201° C. amounts to 128 g. (96.5% of theory, referred to the diamine used). Carbon: found 34.97%, calculated 35.03%; nitrogen: found 4.89%, calculated 5.11%.

EXAMPLE 4

Preparation of active compound XIX 270 g. $N^1$-pentachlorophenyl-$N^1,N^2,N^2$-trimethyl tetramethylene-diamine (0.713 mol), 111 g. 2,5-dimethylbenzyl chloride (0.718 mol) and 100 ml. methyl-cyclohexane are mixed and kept at 82° C. for 40 hours. During the reaction time, the mixture is diluted with a further 600 ml. methyl-cyclohexane. The crystals which formed are separated at room temperature, washed twice with 200 ml. methyl-cyclohexane, once with 300 ml. acetone and dried in a vacuum at 60° C. The yield of $N^2$-[4-($N^1$-pentachlorophenyl - $N^1$ - methyl-amino)butyl]-$N^2,N^2$-dimethyl-$N^2$-(2′,5′-dimethyl-benzyl) ammonium chloride of melting point 183° C. amounts to 356.5 g. (93.5% of theory, referred to the diamine used).

EXAMPLE 5

Preparation of active compound IX 108 g. $N^1$-pentachlorophenyl-$N^2,N^2$-dimethyl-ethylenediamine (0.321 mol), 100 ml. xylene, and 25 g. allyl chloride (0.326 mol) are mixed, kept at 60° C. for 1 hour and then heated to 100° C. in the course of 5 hours. The mixture is kept at 100° C. for 48 hours. The crystals are then separated, washed with light petrol and dried in a vacuum at 70° C. The yield of $N^2$-[2-($N^1$-pentachlorophenyl-amine)ethyl]-$N^2,N^2$-dimethyl-$N^2$-allyl ammonium chloride amounts to 95 g. (71.5% of theory, referred to the diamine used). When recrystallized from diethyl ketone/ethanol (8:1), the compound has M.P. 175–181° C. Carbon: found 37.47%, calculated 37.81%; nitrogen: found 6.72%, calculated 6.78%.

EXAMPLE 6

Preparation of active compound XXIV 81.3 g. $N^1$-pentachlorophenyl-$N^1,N^2,N^2$-trimethylhexamethylene-diamine (0.2 mol), 130 ml. anhydrous methyl ethyl ketone and 34.1 g. p-ethoxybenzyl chloride (0.2 mol) are kept at about 78° C. for 20 hours; the liquid reaction mixture is then treated with 300 ml. cyclohexane and cooled with stirring. The resultant crystals of the ammonium salt are separated and washed with cyclohexane. The yield of $N^2$-[6-($N^1$-pentachlorophenyl-$N^1$-methyl-amino)hexyl] - $N^2,N^2$ - dimethyl-$N^2$-(4′-ethoxybenzyl) ammonium chloride of M.P. 72° C. amounts to 109 g. (94.5% of theory, referred to the diamine used).

The $N^1$ - pentachlorophenyl-$N^1,N^2,N^2$-trimethyl - hexamethylene-diamine used as starting material is not yet known. It is prepared by adding a solution of 109.4 g. N-pentachlorophenyl-hexamethylene-diamine (0.3 mol) in 163 ml. xylene in the course of 40 minutes to a mixture, kept at 84–90° C. of 80 g. 98% formic acid (1.7 mol) and 94 g. of a 35% formaldehyde solution (1.1 mol), and keeping the mixture at 90° C. for 5 hours. For working up, the reaction mixture is treated with 700 ml. water, the upper phase containing the xylene is separated, the aqueous phase is rendered strongly alkaline and extracted with cyclohexane. The cyclohexane phase yields 115 g. crude $N^1$ - pentachlorophenyl - $N^1,N^2,N^2$-trimethyl - hexamethylene-diamine from which 108.5 g. of the purified product of boiling point 160° C./0.02 mm. Hg can be obtained by distillation.

EXAMPLE 7

Preparation of active compound XXV 69 g. $N^1$-pentachlorophenyl-$N^1,N^2,N^2$-trimethyl-hexamethylene-diamine (0.17 mol) dissolved in 100 ml. methylcyclohexane, are mixed with 39.8 g. 2,3-dibromoallyl chloride (0.17 mol) and heated at 80° C. for 18 hours. The reaction mixture is then diluted with 400 ml. methylcyclohexane and allowed to cool. The solvent is decanted from the precipitated reaction product; this is stirred again with 200 ml. methyl-cyclohexane at about 80° C., and the ammonium salt is separated from the solvent. The ammonium salt is finally heated to 70° C. in a high vacuum. 95 g. of a hygroscopic material, $N^2$-[6-(N′-pentachlorophenyl - N′ - methyl-amino)hexyl]-$N^2,N^2$-dimethyl-$N^2$-(2′,3′-dibromoallyl) ammonium chloride, are obtained. Bromine: found 24.8%, calculated 24.9%; chloride: found 32.7%, calculated 32.3%; nitrogen: found 4.43%, calculated 4.37%.

The 2,3-dibromoallyl chloride used as starting material can be obtained by adding bromine at 5–10° C. onto propargyl chloride dissolved in carbon tetrachloride; B.P. 63–68° C./8 mm. Hg.

EXAMPLE 8

Preparation of active compound XXVI 12 g. N¹-pentachlorophenyl - N¹,N²,N² - triethyl-hexamethylene-diamine dissolved in 90 ml. cyclohexane are mixed with 4 g. methyl iodide and kept at 80° C. for 3 hours. The precipitated ammonium salt is separated and washed with cyclohexane. Yield 7 g. N²-[6-(N¹-pentachlorophenyl - N¹ - ethylamino)hexyl]-N²,N²-diethyl - N²-ethyl ammonium iodide. Carbon: found 39.0%, calculated 38.6%; nitrogen: found 4.70%, calculated 4.74%; iodine: found 21.1%, calculated 21.5%.

The N¹-pentachlorophenyl-N¹,N²,N²-triethyl-hexamethylene diamine is obtained by heating hexachlorobenzene with an excess of N¹,N²,N²-triethyl-hexamethylene-diamine at 225° C. for 10 hours, treating the reaction product with a sodium hydroxide solution and cyclohexane, distilling the components soluble in cyclohexane, and separating the fraction of B.P. 164° C./0.009 mm. Hg.

EXAMPLE 9

Using the procedure of Example 4 with corresponding molar amounts of N¹-pentabromophenyl-N¹-ino-butyl-N², N²-diethyl-trimethylene-diamine and 3-bromobenzyl bromide, the corresponding N²-[3 - (N¹-pentabromophenyl-N¹-ino-butylamino)propyl] - N²,N²-diethyl-N-(3'-bromobenzyl)ammonium bromide is produced.

Advantageously, in accordance with the present invention, in the foregoing formulae:

A represents lower alkylene having at least 2 carbon atoms, such as di-, tri-, tetra-, penta-, and hexa- -methylene, especially lower alkylene having 2–6 carbon atoms;

R' represents hydrogen or alkyl having 1–4 carbon atoms, such as methyl, ethyl, n-propyl, isopropyl, n-butyl, isobutyl, sec.-butyl, especially alkyl having 1–2 carbon atoms;

Each R" respectively represents:

(a) Aryl-methyl having 6–10 carbon atoms in the aryl moiety, such as phenylmethyl (i.e. benzyl), naphthylmethyl, etc.; such aryl-methyl which is substituted with one or more and preferably up to 5 to 7 of the following substituents:

Halo, such as chloro, bromo, iodo and fluoro, especially mono-, di- and poly- as well as mixed di- and poly- -chloro, -bromo, -iodo and -fluoro, most especially chloro and bromo;

Nitro;

Lower alkoxy, such as methoxy, ethoxy, n-propoxy, isopropoxy, n-butoxy, isobutoxy, sec.-butoxy, tert.-butoxy, especially alkoxy having 1–2 carbon atoms;

Alkyl having 1–12 carbon atoms, such as methyl, ethyl, n-propyl, isopropyl, n-butyl, isobutyl, sec.-butyl, tert.-butyl, amyl, hexyl, heptyl, octyl, nonyl, decyl, undecyl dodecyl;

Methylene dioxy;

And mixtures of such substituents;

(b) Or lower aliphatic, such as lower alkyl, i.e. methyl to tert.-butyl inclusive as enumerated above under R', and the like; lower alkenyl, i.e. vinyl, α-, β- and γ- -allyl, butenyl; lower alkynyl, i.e. ethynyl, propynyl( e.g. propargyl), butynyl, and the like, especially aliphatic having 1–4 carbon atoms, and more especially alkyl having 1–4 carbon atoms, alkenyl having 2–4 carbon atoms, and alkynyl having 2–4 carbon atoms;

(c) Or halo-lower-aliphatic, such as the corresponding chloro, bromo, iodo and fluoro substituted lower aliphatic mentioned immediately hereinabove, and corresponding mixed chloro, bromo, iodo, fluoro substituted lower aliphatic, especially such corresponding halo-aliphatic which is chloro and/or bromo substituted, and most especially such halo-aliphatic having 1–4 carbon atoms, and particularly halo-alkyl having 1–4 carbon atoms, halo-alkenyl having 2–4 carbon atoms, and halo-alkynyl having 2–4 carbon atoms, including mixed halo substituents; with the proviso that at most only one R" radical is arylmethyl or substituted aryl methyl, the remaining radicals (2) or all of such radicals being otherwise lower aliphatic or halo-lower aliphatic as noted hereinabove;

Each X respectively represents chloro or bromo; and

Z represents a salt forming anion such as chlorine, bromine, iodine, fluorine, methyl sulfate, toluene sulfonate, dimethyl phosphate, dipropyl phosphonate, and the like, especially halogen and most especially chlorine, bromine and iodine, alkyl sulfate, and most especially lower alkyl sulfate, aryl sulfonate, especially benzene sulfonate and alkyl benzene sulfonate, and particularly lower alkyl benzene sulfonate, alkyl phosphate, especially lower alkyl phosphate, alkyl phosphonate, and especially lower alkyl phosphonate, and the like; the anion Z forming with the penta-halo-phenylamine ammonium cations, a salt which is soluble in water, preferably to give at least a concentration of 0.01%, the chemical constitution of the anion being otherwise of no particular importance, especially considering the batcericidal properties of the instant salts.

It will be realized by the artisan that all of the foregoing compounds contemplated by the present invention possess the desired bactericidal, especially phytopathogenic bactericidal, activity, all of such compounds possessing extremely low phytotoxicity as regards cultivated plants, as well as extremely low toxicity towards warm-blooded animals.

It will be appreciated that the instant specification and examples are set forth by way of illustration and no limitation, and that various modifications and changes may be made without departing from the spirit and scope of the present invention which is to be limited only by the scope of the appended claims.

What is claimed is:

1. A bactericidal composition comprising a mixture of a dispersible carrier vehicle and a bactericidally effective amount of between about 0.005 and 95% by weight of the mixture, of an N-pentahalophenyl-amino ammonium salt having the formula

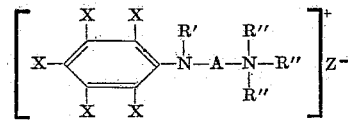

in which A is lower alkylene having at least 2 carbon atoms, R' is selected from the group consisting of hydrogen and alkyl having 1–4 carbon atoms, each R" respectively is selected from the group consisting of phenylmethyl and napthylmethyl; substituted phenylmethyl which is substituted with at least one member independently selected from the group consisting of halo, nitro, lower alkoxy, alkyl having 1–12 carbon atoms and methylene dioxy; lower and halo-lower alkyl, alkeny land alkynyl; with the proviso that at most one R" is selected from the group consisting of such phenylmethyl and naphthylmethyl and such substituted phenylmethyl; X is selected from the group consisting of chloro and bromo, and Z is a halo anion.

2. Composition according to claim 1 wherein A is lower alkylene having 2–6 carbon atoms, R' is selected from the group consisting of hydrogen and alkyl having 1–2 carbon atoms, each R" respectively is selected from the group consisting of phenyl methyl; naphthyl methyl; substituted phenyl methyl which is substituted with at least one member selected from the group consisting of chloro, bromo, nitro, alkoxy having 1–2 carbon atoms, alkyl having 1–12 carbon atoms, methylene dioxy, and mixtures thereof; alkyl having 1–4 carbon atoms; alkenyl having 2–4 carbon atoms; alkynyl having 2–4 carbon atoms; and such alkyl, alkenyl and alkynyl which are substituted with at least one member selected from the group consisting of chloro and bromo; with the proviso that at most one R" is selected from the group consisting of such phenylmethyl, such naphthylmethyl and such substituted phenylmethyl, X is selected from the group consisting of chloro and bromo, and Z is a corresponding salt forming anion selected from the group consisting of chloro, bromo and iodo.

3. Method of combating phytopathogenic bacteria, which comprises applying to (a) said bacteria or (b) their habitat, a bactericidally effective amount of an N-pentahalophenylamino ammonium salt having the formula

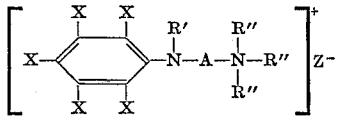

in which A is lower alkylene having at least 2 carbon atoms, R' is selected from the group consisting of hydrogen and alkyl having 1–4 carbon atoms, each R'' respectively is selected from the group consisting of phenylmethyl and naphthylmethyl; substituted phenylmethyl which is substituted with at least one member independently selected from the group consisting of halo, nitro, lower alkoxy, alkyl having 1–12 carbon atoms and methylene dioxy; lower and halo-lower alkyl, alkenyl and alkynyl; with the proviso that at most one R'' is selected from the group consisting of such phenylmethyl and naphthylmethyl and such substituted phenylmethyl, X is selected from the group consisting of chloro and bromo, and Z is a halo anion.

4. Method according to claim 3 wherein A is lower alkylene having 2–6 carbon atoms, R' is selected from the group consisting of hydrogen and alkyl having 1–2 carbon atoms, each R'' respectively is selected from the group consisting of phenyl methyl; naphthyl methyl; substituted phenyl methyl which is substituted with at least one member selected from the group consisting of chloro, bromo, nitro, alkoxy having 1–12 carbon atoms, methylene dioxy, and mixtures thereof; alkyl having 1–4 carbon atoms; alkenyl having 2–4 carbon atoms; alkynyl having 2–4 carbon atoms; and such alkyl, alkenyl and alkynyl which are substituted with at least one member selected from the group consisting of chloro and bromo; with the proviso that at most one R'' is selected from the group consisting of such phenylmethyl, such naphthylmethyl and such substituted phenylmethyl, X is selected from the group consisting of chloro and bromo, and Z is a corresponding salt forming anion selected from the group consisting of chloro, bromo and iodo.

5. Method according to claim 3 wherein such salt is used in the form of a mixture with a dispersible carrier vehicle, such salt being present in a bactericidally effective amount and constituting substantially between about 0.005 and 95% by weight of the mixture.

6. Method according to claim 3 wherein such salt is $N^2$-[6-(N' - pentachlorophenyl-N'-methyl-amino)hexyl]-$N^2,N^2,N^2$-trimethyl ammonium iodide.

7. Method according to claim 3 wherein such salt is $N^2$ - [2-N'-pentachlorophenyl-amino)ethyl] - $N^2,N^2$ - dimethyl-$N^2$-allyl ammonium chloride.

8. Method according to claim 3 wherein such salt is $N^2$-[6-(N' - pentachlorophenyl-N'-methyl-amino)hexyl]-$N^2,N^2$ - dimethyl-$N^2$-(2',5'-dimethylbenzyl) ammonium chloride.

9. Method according to claim 3 wherein such salt is $N^2$-[6 - (N'-pentachlorophenyl-N'-methyl-amino)hexyl]-$N^2,N^2$ - dimethyl-$N^2$-(2',4'-dimethylbenzyl) ammonium chloride.

10. Method according to claim 3 wherein such salt is $N^2$-[2-(N'-pentachlorophenyl-amino)ethyl] - $N^2,N^2$ - dimethyl-$N^2$-(2',5'-dimethylbenzyl) ammonium chloride.

11. Method according to claim 3 wherein such salt is $N^2$-[6 - (N' - pentachlorophenyl-amino)hexyl] - $N^2,N^2$-diallyl-$N^2$-methyl-ammonium methyl sulfate.

12. Method according to claim 3 wherein such salt is $N^2$-[6 - (N'-pentachlorophenyl-N'-methyl-amino)hexyl]-$N^2,N^2$-dimethyl-$N^2$-(4'-ethoxybenzyl) ammonium chloride.

13. Method according to claim 3 wherein such salt is $N^2$-[6 - (N' - pentachlorophenyl-N'-ethyl-amino)hexyl]-$N^2,N^2$-diethyl-$N^2$-methyl ammonium iodide.

References Cited
UNITED STATES PATENTS

| | | | |
|---|---|---|---|
| 2,099,525 | 11/1937 | Krzikacca et al. | 260—96 |
| 2,087,131 | 7/1937 | Taub et al. | 260—567.6 |
| 2,918,401 | 12/1959 | Copp | 260—567.6 |
| 3,328,464 | 6/1967 | Gundel | 260—567.6 |

JEROME D. GOLDBERG, Primary Examiner

L. SCHENKMAN, Assistant Examiner

U.S. Cl. X.R.

424—282

UNITED STATES PATENT OFFICE
CERTIFICATE OF CORRECTION

Patent No. 3,659,018  Dated Apr. 25, 1972

Inventor(s) WERNER DAUM and HANS SCHEINPFLUG

It is certified that error appears in the above-identified patent and that said Letters Patent are hereby corrected as shown below:

Col. 1, line 3, "N-PENTAHALOPHENLI-AMINO-AMMONIUM" should read --N-PENTAHALOPHENYL-AMINO-AMMONIUM--

Col. 2, line 31, "pressure" should be --presence--

Col. 2, line 45, the structural formula should read as follows:

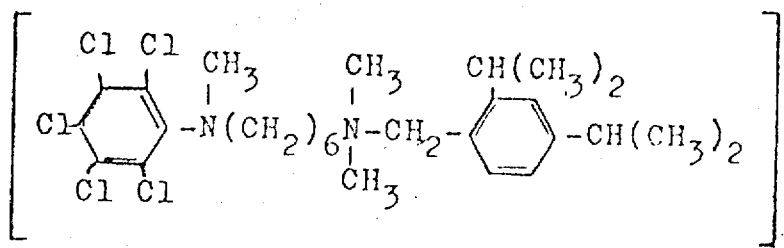

(III)

Col. 2, line 50, "acocrdance" should be --accordance--

Col. 4, line 10, "ethyl(" should be --ethyl]--

Col. 5, line 5, the structural formula should read as follows:

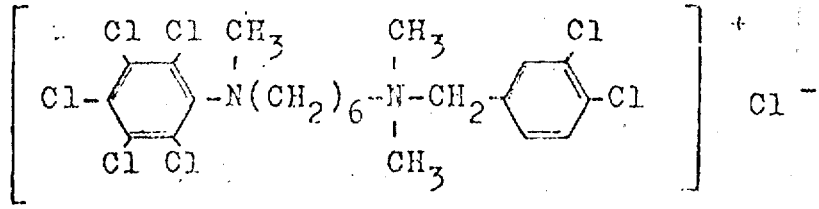

Col. 6, line 11, after "hexyl" insert --]--

UNITED STATES PATENT OFFICE
CERTIFICATE OF CORRECTION

Patent No. 3,659,018 Dated Apr. 25, 1972

Inventor(s) WERNER DAUM and HANS SCHEINPFLUG - 2 -

It is certified that error appears in the above-identified patent and that said Letters Patent are hereby corrected as shown below:

Col. 6, line 25, the structural formula should read as follows:

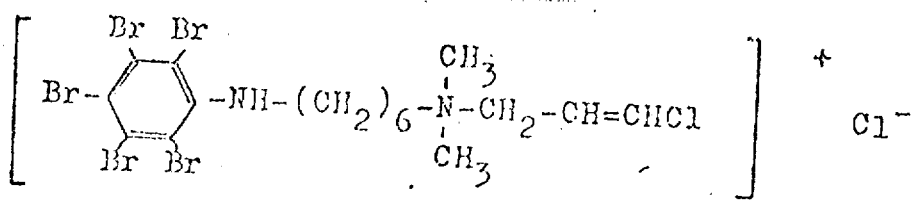

Col. 8, line 54, "on" should be --no--

Col. 9, line 27, "dichloropropane" should be --dichloropropene--

Col. 10, line 15, "phenyl-amine" should be --phenyl-amino--

Col. 11, line 10, "ethyl" should be --methyl--

Col. 11, line 22, "ino-butyl" should be --iso-butyl--

Col. 11, line 25, "-ino-butylamino" should be --iso-butyl-amino--

Col. 12, line 15, "cations" should be --cation--

Col. 12, line 28, "no" should be --not--

Col. 12, line 53, "alkeny land" should be --alkenyl and--

Col. 14, line 10, after "[2" insert --(--

Signed and sealed this 26th day of December 1972.

(SEAL)
Attest:

EDWARD M. FLETCHER, JR.
Attesting Officer

ROBERT GOTTSCHALK
Commissioner of Patents